(12) United States Patent
Nishida et al.

(10) Patent No.: US 12,387,751 B2
(45) Date of Patent: Aug. 12, 2025

(54) FLEXURE AND DISK DRIVE SUSPENSION

(71) Applicant: NHK SPRING CO., LTD., Yokohama (JP)

(72) Inventors: Tatsuhiko Nishida, Yokohama (JP); Ryoichi Tazawa, Yokohama (JP); Shoku Tei, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 18/444,792

(22) Filed: Feb. 19, 2024

(65) Prior Publication Data
US 2024/0312484 A1    Sep. 19, 2024

(30) Foreign Application Priority Data

Mar. 17, 2023   (JP) ................ 2023-043367

(51) Int. Cl.
  *G11B 5/48*    (2006.01)
(52) U.S. Cl.
  CPC .......... *G11B 5/4833* (2013.01); *G11B 5/4853* (2013.01); *G11B 5/486* (2013.01); *G11B 5/4873* (2013.01)
(58) Field of Classification Search
  None
  See application file for complete search history.

(56) References Cited

U.S. PATENT DOCUMENTS

| | | | |
|---|---|---|---|
| 7,218,481 B1 * | 5/2007 | Bennin | G11B 5/5552 |
| 8,149,542 B2 * | 4/2012 | Ando | H10N 30/875 |
| | | | 360/245.9 |
| 8,199,442 B2 | 6/2012 | Okawara et al. | |
| 8,810,972 B1 * | 8/2014 | Dunn | G11B 5/4873 |
| | | | 360/294.4 |
| 9,076,957 B2 * | 7/2015 | Ikeji | G11B 5/4873 |
| 2002/0089793 A1 * | 7/2002 | Nakagawa | H05K 3/328 |
| 2011/0051290 A1 * | 3/2011 | Inoue | H10N 30/875 |
| 2011/0141624 A1 * | 6/2011 | Fuchino | G11B 5/4873 |
| | | | 29/603.07 |
| 2013/0133939 A1 * | 5/2013 | Ishii | G11B 5/486 |
| | | | 174/262 |
| 2013/0314821 A1 * | 11/2013 | Arai | G11B 5/4873 |
| | | | 360/244.5 |
| 2013/0319748 A1 * | 12/2013 | Ishii | H05K 1/0298 |
| | | | 174/262 |

(Continued)

FOREIGN PATENT DOCUMENTS

| JP | 3626688 B2 * | 3/2005 | ........... G11B 5/4873 |
|---|---|---|---|
| JP | 5318703 B2 | 10/2013 | |

*Primary Examiner* — William J Klimowicz (74) *Attorney, Agent, or Firm* — Holtz, Holtz & Volek PC (57) ABSTRACT

A flexure includes a body portion including a first metal base, a terminal portion electrically connected to an actuator, and a connection portion connecting the body portion with the terminal portion and not including the first metal base. The wiring portion includes a base insulating layer, a conductor layer provided on the base insulating layer, and a cover insulating layer covering the conductor layer. The cover insulating layer includes a first cover portion provided on the connection portion, and the base insulating layer includes a first base portion provided on the connection portion and having a thickness smaller than a thickness of the first cover portion.

11 Claims, 7 Drawing Sheets

(56) References Cited

U.S. PATENT DOCUMENTS

| | | | | |
|---|---|---|---|---|
| 2013/0321958 | A1* | 12/2013 | Ikeji | B23K 3/0638 |
| | | | | 228/8 |
| 2014/0362467 | A1* | 12/2014 | Nojima | G11B 5/4873 |
| | | | | 360/97.13 |
| 2017/0179005 | A1* | 6/2017 | Yamada | H01L 21/4828 |
| 2017/0236540 | A1* | 8/2017 | Kawao | G11B 5/4853 |
| | | | | 360/244.1 |
| 2022/0097357 | A1* | 3/2022 | Nakano | G11B 5/483 |
| 2023/0282230 | A1* | 9/2023 | Sugiyama | G11B 5/4853 |
| | | | | 360/294.4 |
| 2023/0419991 | A1* | 12/2023 | Nishida | G11B 5/4846 |

* cited by examiner

FLEXURE AND DISK DRIVE SUSPENSION

CROSS-REFERENCE TO RELATED APPLICATIONS

This application is based upon and claims the benefit of priority from prior Japanese Patent Application No. 2023-043367, filed Mar. 17, 2023, the entire contents of which are incorporated herein by reference.

BACKGROUND OF THE INVENTION

1. Field of the Invention

The present invention relates to a flexure and a disk drive suspension.

2. Description of the Related Art

A disk drive is used in an information processing apparatus such as a personal computer. The disk drive includes a magnetic disk rotatable about a spindle, a carriage pivotable about a pivot, and the like. A disk drive suspension is provided on an arm of the carriage. The disk drive suspension comprises a baseplate, a load beam, a flexure arranged along the load beam, and the like.

A slider is provided on a gimbal portion formed near a distal end of the flexure. The slider is provided with elements for performing access such as reading and writing of data stored in a disk. In order to increase recording density of the disk, a magnetic head needs to be positioned more quickly and precisely relative to a recording surface of the disk.

For improving positioning accuracy of the magnetic head, a dual stage actuator (DSA) suspension using a positioning motor (voice coil motor) and an actuator mounted on a baseplate side together and a triple stage actuator (TSA) suspension in which an actuator is further mounted on a magnetic head side are known.

Conventionally, various proposals have been made on power supply to the actuator. JP 5318703 B discloses an electrical connection structure to piezoelectric element functioning, for example, as the actuator.

Even in consideration of JP 5318703 B described above, the connection between the piezoelectric element and the flexure has room for improvement in various ways.

BRIEF SUMMARY OF THE INVENTION

One of objects of the present invention is to provide a flexure and a disk drive suspension capable of increasing reliability.

A flexure according to one of embodiments includes a first metal base and a wiring portion overlapping with the first metal base. The flexure includes a body portion including the first metal base, a terminal portion electrically connected to an actuator, and a connection portion connecting the body portion with the terminal portion and not including the first metal base.

The wiring portion includes a base insulating layer including a first surface formed over the body portion, the connection portion, and the terminal portion and facing the first metal base, and a second surface on a side opposite to the first surface, a conductor layer provided on the second surface, and a cover insulating layer covering the conductor layer. The cover insulating layer includes a first cover portion provided on the connection portion, and the base insulating layer includes a first base portion provided on the connection portion and having a thickness smaller than a thickness of the first cover portion.

The base insulating layer may include a second base portion provided on the body portion and having a thickness greater than the thickness of the first base portion. The base insulating layer may include a third base portion provided on the terminal portion and having a thickness greater than the thickness of the first base portion.

The cover insulating layer may include a first layer formed over the body portion, the connection portion, and the terminal portion, and a second layer formed on the connection portion and overlapping with the first layer. The cover insulating layer may include a second cover portion provided on the body portion and having a thickness smaller than the thickness of the first cover portion. The insulating cover layer may include a third cover portion provided on the terminal portion and having a thickness smaller than the thickness of the first cover portion.

A disk drive suspension according to one of embodiments comprises a load beam, the flexure overlapping with the load beam, and an actuator electrically connected to the terminal portion.

The disk drive suspension may further comprise an adhesive member, the actuator may include an electrode facing the first surface, and the adhesive member may electrically connect the electrode with the conductor layer located on the terminal portion.

The flexure may further include a second metal base located between the base insulating layer located on the terminal portion and the electrode, and a through hole connecting the electrode with the conductor layer may be formed in the base insulating layer located on the second metal base and the terminal portion.

The base insulating layer may be provided on the body portion and include a second base portion having a thickness greater than the thickness of the first base portion. A surface located on the first base portion of the second surface may be located closer to the load beam than a surface located on the second base portion.

The base insulating layer may be provided on the body portion and include a second base portion having a thickness greater than the thickness of the first base portion. A surface located on the first base portion of the first surface may be farther from the load beam than a surface located on the second base portion.

According to the above configuration of the flexure and the disk drive suspension, reliability can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be hereinafter described with reference to the accompanying drawings. In order to make the description clearer, the sizes, shapes and the like of the respective parts may be changed and illustrated schematically in the drawings as compared with those in an accurate representation.

First Embodiment

Figure 1:
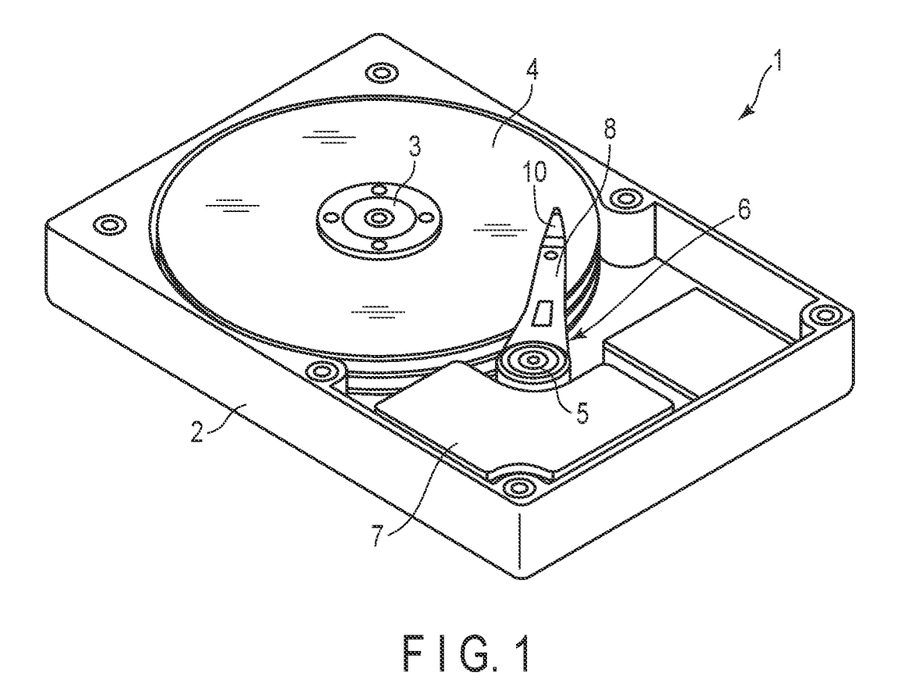
FIG. 1 is a schematic perspective view showing an example of a disk drive according to a first embodiment.

FIG. 1 is a schematic perspective view showing an example of a disk drive (HDD) 1 of the present embodiment. In the example shown in FIG. 1, the disk drive 1 comprises a casing 2, a plurality of magnetic disks (hereinafter simply referred to as a disk 4) rotatable about a spindle 3, a carriage 6 pivotable about a pivot 5, and a positioning motor (voice coil motor) 7 for driving the carriage 6. The case 2 is sealed by a lid (not shown).

Figure 2:
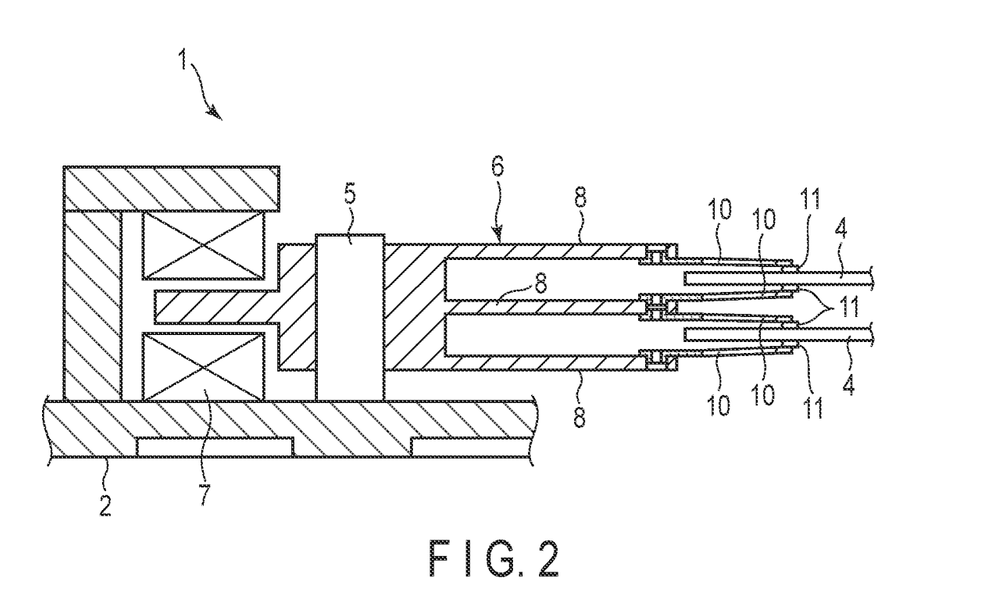
FIG. 2 is a schematic cross-sectional view showing a part of the disk drive according to the first embodiment.

FIG. 2 is a schematic cross-sectional view showing a part of the disk drive 1 of the present embodiment. The carriage 6 is provided with a plurality of (for example, three) arms 8. At a distal end portion of each of the plurality of arms 8, a disk drive suspension (hereinafter simply referred to as a suspension 10) is mounted. A slider 11, which constitutes a magnetic head, is provided at a distal end portion of the suspension 10. When the disk 4 rotates at high speed, an air bearing is formed as air flows in between the disk 4 and the slider 11.

When the carriage 6 is rotated by the positioning motor 7, the suspension 10 moves radially relative to the disk 4, and the slider 11 thereby moves to a desired track of the disk 4. Elements capable of converting magnetic signals and electrical signals, such as MR elements are provided at a distal end portion of the slider 11, for example. By these elements, access such as writing data to the disk 4 or reading data from the disk 4 is performed.

Figure 3:
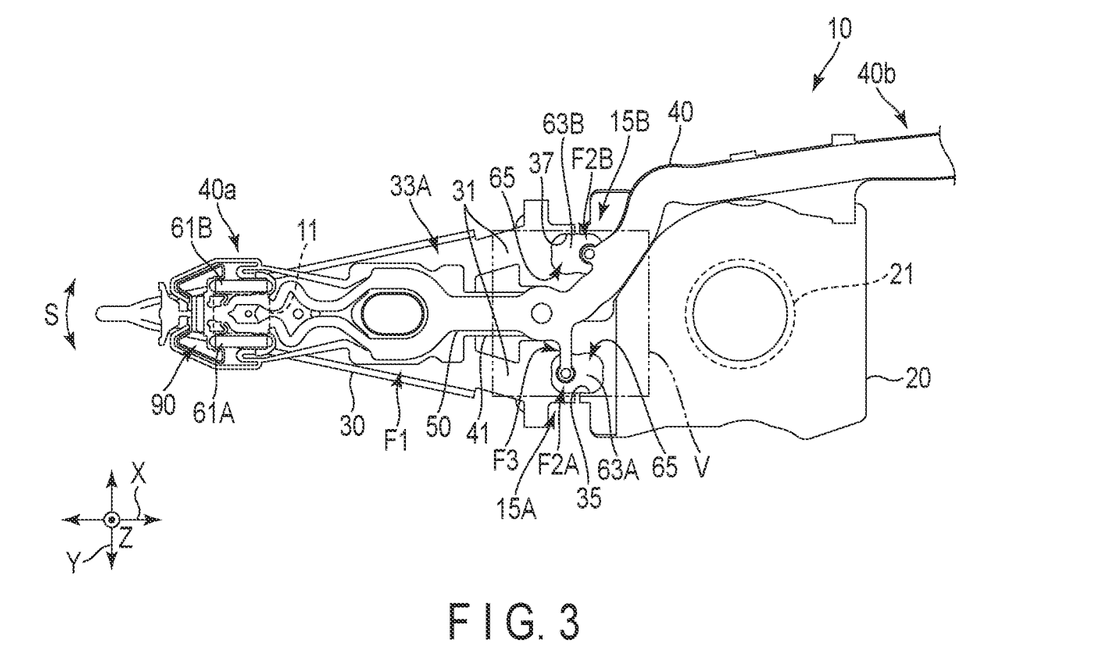
FIG. 3 is a schematic plan view of a suspension according to the first embodiment.
Figure 4:
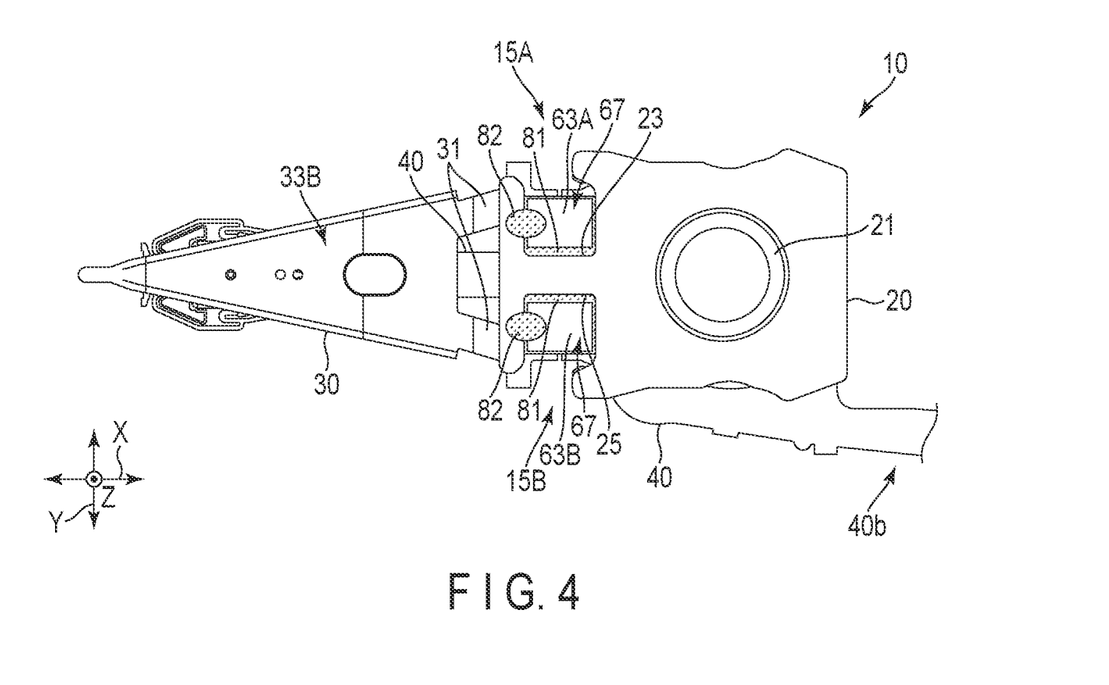
FIG. 4 is a schematic plan view of the suspension according to the first embodiment.
Figure 5:
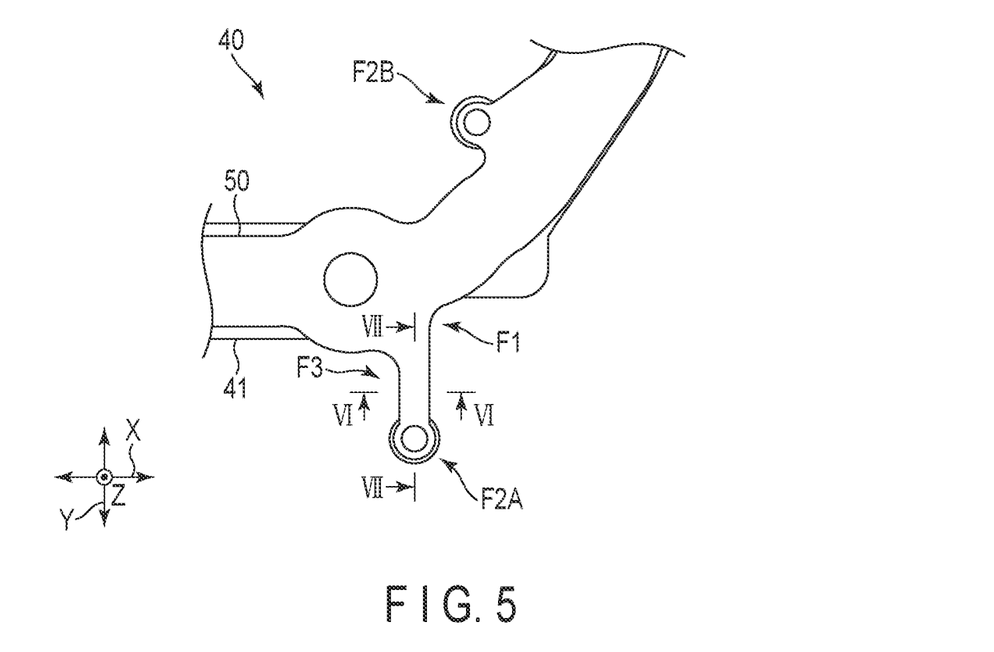
FIG. 5 is a schematic partially enlarged view showing the flexure located on a V portion in FIG. 3.

FIG. 3 and FIG. 4 are schematic plan views of the suspension 10 of the present embodiment. FIG. 5 is a schematic partially enlarged view showing the flexure located on a V portion in FIG. 3. In FIG. 4, the suspension 10 is viewed in a direction opposite to that in FIG. 3. In the present embodiment, a TSA type suspension is disclosed as an example of the suspension 10. The suspension 10 comprises a baseplate 20, a load beam 30, and a flexure 40.

The baseplate 20, the load beam 30, and the flexure 40 all extend in the longitudinal direction of the suspension 10. In the following descriptions, the longitudinal direction of each of the suspension 10, the baseplate 20, the load beam 30, and the flexure 40 is defined as the first direction X. In the first direction X, with reference to the baseplate 20, a side on which the slider 11 is mounted is referred to as a distal end side in some cases.

A direction intersecting (for example, orthogonal to) the first direction X is defined as the second direction Y of the suspension 10, the baseplate 20, the load beam 30, the flexure 40, and the like. A direction intersecting (for example, orthogonal to) the first direction X and the second direction Y is defined as the third direction Z of the suspension 10, the baseplate 20, the load beam 30, the flexure 40, and the like.

A direction of the third direction Z is referred to as up or above and an opposite direction of the third direction Z is referred to as down or below in some cases. The length along the third direction Z is hereinafter referred to as the thickness in some cases. A sway direction S (shown in FIG. 3) is defined as represented by an arcuate arrow in the vicinity of the distal end of the load beam 30.

The baseplate 20 is connected to the arm 8 (shown in FIG. 2). The baseplate 20 can be formed of a metal material such as stainless steel, for example. For example, the thickness of the baseplate 20 is 100 μm or less, but is not limited to this example.

The baseplate 20 includes a circular boss portion 21. The baseplate 20 is attached to the arm 8 through the boss portion 21. The baseplate 20 further includes apertures 23 and 25, as shown in FIG. 4. The apertures 23 and 25 penetrate the baseplate 20.

The load beam 30 can be formed of a metal material such as stainless steel. The thickness of the load beam 30 is smaller than the thickness of the baseplate 20. For example, the thickness of the load beam 30 is 20 to 80 μm, but is not limited to this example.

The load beam 30 has a tapered shape toward a distal end (left side in FIG. 3 and FIG. 4). The load beam 30 is elastically supported by the baseplate 20 through a spring portion 31. The load beam 30 is fixed to the baseplate 20 by spot welding using laser, for example. The load beam 30 has a surface 33A on which the flexure 40 is arranged and a surface 33B on a side opposite to the surface 33A.

The load beam 30 includes a portion overlapping with the baseplate 20. Apertures 35 and 37 are formed in this portion. The aperture 35 is aligned with the aperture 37 at an interval in the second direction Y. The apertures 35 and 37 penetrate the surface 33A and the surface 33B.

In the third direction Z, the aperture 35 overlaps with the aperture 23, and the aperture 37 overlaps with the aperture 25. The apertures 35 and 37 and the apertures 23 and 25 form actuator mounting portions 15A and 15B.

The flexure 40 is arranged along the baseplate 20 and the load beam 30. A part of the flexure 40 overlaps with the load beam 30. The flexure 40 is fixed to the baseplate 20 and the load beam 30 by spot welding using laser, for example.

The flexure 40 includes a metal base 41 (first metal base) formed of a thin stainless steel plate, and a wiring portion 50 overlapping with the metal base 41, for example. The thickness of the metal base 41 is smaller than the thickness of the load beam 30. The thickness of the metal base 41 is 15 to 20 μm, for example. The metal base 41 overlaps with the surface 33A of the load beam 30.

As shown in FIG. 3 and FIG. 5, the flexure 40 includes a body portion F1, terminal portions F2A and F2B, and a connection portion F3 connecting the body portion F1 with the terminal portion F2A. The body portion F1 includes a distal end portion 40a and a tail portion 40b extending toward the rear of the baseplate 20 (right side in FIG. 3 and FIG. 4).

The slider 11, which constitutes the magnetic head, is provided at the distal end portion 40a of the body portion F1. In the example shown in FIG. 3, the slider 11 to be mounted is represented by a dashed line. Each of the terminal portions F2A and F2B is electrically connected to the actuator. The terminal portion F2A overlaps with the aperture 35, and the terminal portion F2B overlaps with the aperture 37. The connection portion F3 extends from the body portion F1 toward the aperture 35 and connects the body portion F1 with the terminal portion F2A.

The suspension 10 further comprises piezoelectric elements 61A and 61B and piezoelectric elements 63A and 63B. In the present embodiment, the piezoelectric elements 61A, 61B, 63A, and 63B are examples of actuators. Each of the piezoelectric elements 61A, 61B, 63A, and 63B is formed of a piezoelectric material such as zirconate titanate (PTZ).

When voltage is applied to the piezoelectric elements 61A, 61B, 63A, and 63B, piezoelectric body expands and contracts in response to the applied voltage, the distal end side of the suspension 10 can be moved a minute amount in the sway direction S.

The piezoelectric elements 61A and 61B are located on both sides of the slider 11 in the second direction Y. The piezoelectric elements 61A and 61B may be arranged on a side opposite to the side on which the slider 11 of the flexure 40 is mounted, for example.

The piezoelectric elements 63A and 63B are provided on the actuator mounting portions 15A and 15B, respectively. More specifically, the piezoelectric elements 63A and 63B are accommodated in the apertures 23 and 25, respectively. The piezoelectric elements 63A and 63B are fixed to the surface 33B of the load beam 30 by an adhesive member 81. In FIG. 4, the adhesive member 81 is represented by dots. For example, the adhesive member 81 is an electrically insulating resin adhesive such as epoxy.

The piezoelectric element 63A is electrically connected to the terminal portion F2A, and the piezoelectric element 63B is electrically connected to the terminal portion F2B. The piezoelectric elements 63A and 63B include an electrode 65 located on one side of the third direction Z (surface facing the surface 33B) and an electrode 67 located on the surface of the other side in the third direction Z.

The electrodes 65 and 67 are formed into flat electrode surfaces by sputtering or plating, for example. The electrodes 65 of the piezoelectric elements 63A and 63B are exposed from the apertures 35 and 37, respectively.

The electrodes 65 are electrically connected to the wiring portion 50 of the flexure 40 through the terminal portions F2A and F2B. The electrode 67 is electrically connected to the baseplate 20, which is the ground side, by an adhesive member 82. In FIG. 4, the adhesive member 82 is represented by dots. The adhesive member 82 can be formed of, for example, a conductive adhesive such as a silver paste.

Next, an example of a structure that can be applied to the connection portion F3 of the flexure 40 will be described.

Figure 6:
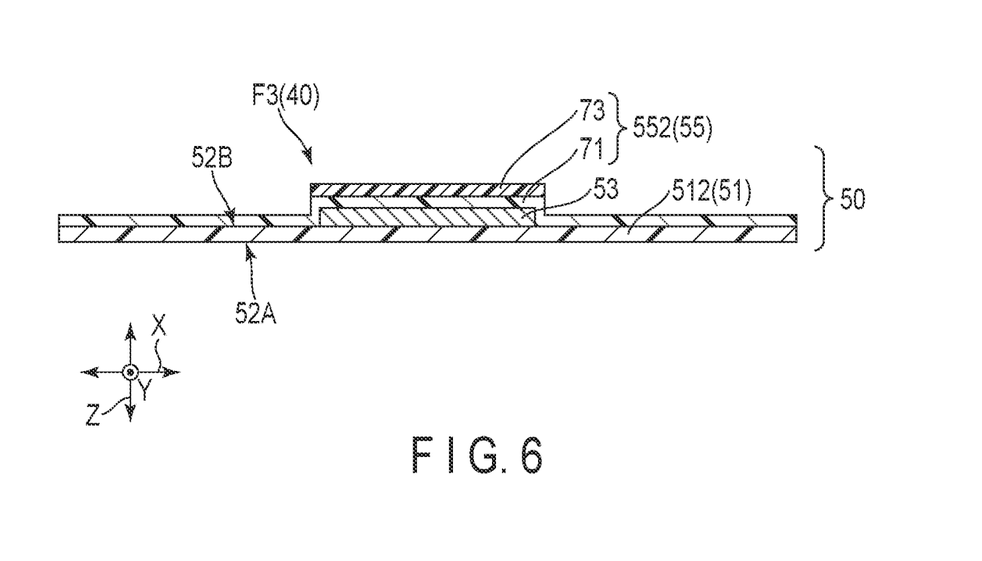
FIG. 6 is a schematic cross-sectional view of the flexure along line VI-VI in FIG. 5.
Figure 7:
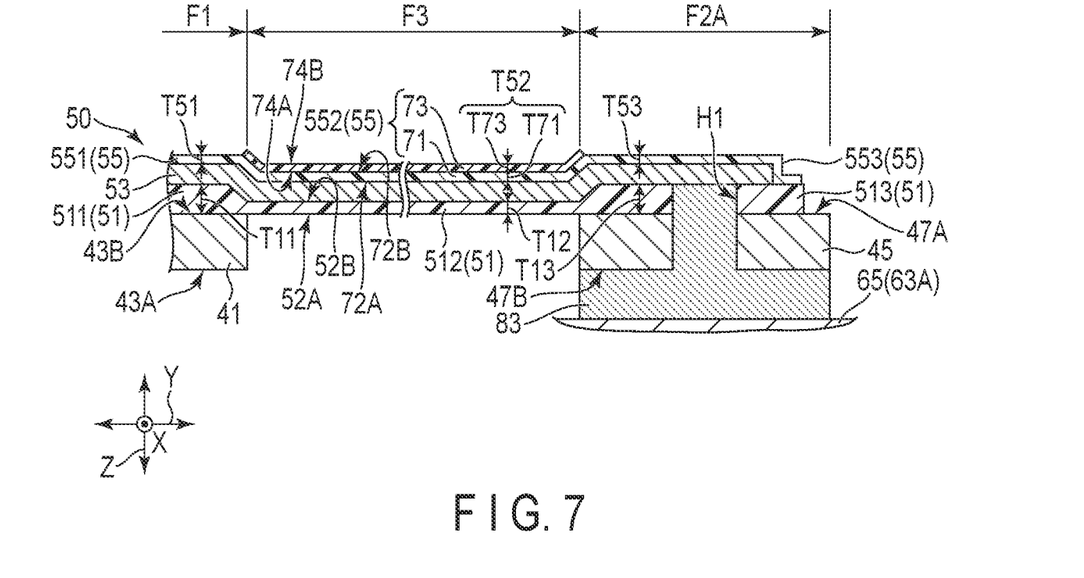
FIG. 7 is a schematic cross-sectional view of the flexure along line VII-VII in FIG. 5.

FIG. 6 is a schematic cross-sectional view of the flexure 40 along VI-VI line shown in FIG. 5. FIG. 7 is a schematic cross-sectional view of the flexure 40 along VII-VII line shown in FIG. 5. In FIG. 6, the flexure 40 is viewed along the second direction Y, and in FIG. 7, the flexure 40 is viewed along the first direction X.

The flexure 40 includes the metal base 41 and the wiring portion 50, as described above. The metal base 41 includes a surface 43A facing the surface 33A of the load beam 30 and a surface 43B on a side opposite to the surface 43A, as shown in FIG. 7. While the body portion F1 includes the metal base 41, the connection portion F3 does not include the metal base 41.

The wiring portion 50 includes a base insulating layer 51, a conductor layer 53, and a cover insulating layer 55. The base insulating layer 51 and the cover insulating layer 55 can be formed of an electrically insulating resin material such as polyimide, for example.

The conductor layer 53 can be formed of a metal material with high electrical conductivity such as copper. The conductor layer 53 is formed by coating, an additive method (for example, semi-additive method or full additive method) using plating, or the like, for example.

The conductor layer 53 is formed in the body portion F1 from a connection terminal (not shown) located on the tail portion 40b to the distal end portion 40a. The conductor layer 53 includes a plurality of conductive lines, for example.

The plurality of conductive lines include conductive lines for reading and conductive lines for writing, for example. Each of these conductive lines for reading and conductive lines for writing is connected to the slider 11. Conductive lines for supplying power to the piezoelectric elements 63A and 63B, which are part of the plurality of conductive lines, branch from the body portion F1 and extend to the terminal portions F2A and F2B.

The base insulating layer 51 is formed over the body portion F1, the connection portion F3, and the terminal portion F2A, as shown in FIG. 7. The base insulating layer 51 includes a surface 52A (first surface) facing the surface 43B of the metal base 41, and a surface 52B (second surface) on a side opposite to the surface 52A.

The base insulating layer 51 includes a base portion 511 (second base portion) provided on the body portion F1, a base portion 512 (first base portion) provided on the connection portion F3, and a base portion 513 (third base portion) provided on the terminal portion F2A. The base portion 511, the base portion 512, and the base portion 513 are integrally formed.

The base portion 512 has a uniform thickness in the first direction X in the example shown in FIG. 6. The base portion 512 has a uniform thickness in the second direction Y in the example shown in FIG. 7.

A thickness T12 (shown in FIG. 7) of the base portion 512 is smaller than a thickness T11 (shown in FIG. 7) of the base portion 511 and a thickness T13 (shown in FIG. 7) of the base portion 513. In other words, the base portions 511 and 513 have the thicknesses T11 and T13 greater than that of the base portion 512.

The thickness T11 of the base portion 511 is equivalent to the thickness T13 of the base portion 513, for example. The thickness T11 of the base portion 511 may be different from the thickness T13 of the base portion 513.

The thicknesses T11 and T13 of the base portion 511 and the base portion 513 are 7 μm to 12 μm, for example. The thicknesses T11 and T13 of the base portion 511 and the base portion 513 are 10 μm in one example.

The thickness T12 of the base portion 512 is 3 μm to 7 μm, for example. The thickness T12 of the base portion 512 is 5 μm in one example. The thickness T12 of the base portion 512 is the half of the thicknesses T11 and T13 of the base portion 511 and the base portion 513 in one example.

The base portion 512 of the base insulating layer 51 is formed, in one example, through an exposure process using a gradation mask. For example, in a case of positive-type photosensitive polyimide, by adjusting the amount of exposure in the area corresponding to the base portion 512, the area can be removed by development, and the thickness T12 of the base portion 512 can be made smaller than the other portions.

In this case, the surface 52B located on the base portion 512 is located lower than the surface 52B located on the base portion 511 and the base portion 513 (load beam 30 side).

As shown in FIG. 7, since the metal base 41 is not provided on the connection portion F3, an air layer is formed between the surface 52A located on the base portion 512 and the surface 33A of the load beam 30.

The conductor layer 53 is provided on the surface 52B and overlaps with the base portions 511, 512, and 513. The conductor layer 53 has a uniform thickness in the example shown in FIG. 7. For example, the thickness of the conductor layer 53 is 5 μm to 12 μm and is 6 μm in one example.

The cover insulating layer 55 covers the base insulating layer 51 and the conductor layer 53. In other words, the conductor layer 53 is located between the base insulating layer 51 and the cover insulating layer 55. A part of the cover insulating layer 55 covers the base insulating layer 51 in the example shown in FIG. 6. In other words, the part of the cover insulating layer 55 is in contact with the surface 52B.

The cover insulating layer 55 includes a cover portion 551 (second cover portion) provided on the body portion F1, a cover portion 552 (first cover portion) provided on the connection portion F3, and a cover portion 553 (third cover portion) provided on the terminal portion F2A. In the connection portion F3, the base portion 512, the conductor layer 53, and the cover portion 552 are stacked in this order.

A thickness T52 (shown in FIG. 7) of the cover portion 552 is greater than a thickness T51 (shown in FIG. 7) of the cover portion 551 and a thickness T53 (shown in FIG. 7) of the cover portion 553. In other words, the cover portions 551 and 553 have the thicknesses T51 and T53 smaller than that of the cover portion 552. The thickness of the cover portion 552 corresponds to the thickness of a portion of the cover portion 552 that overlaps with the conductor layer 53.

The thickness T51 of the cover portion 551 is the same as the thickness T53 of the cover portion 553, for example. The thickness T51 of the cover portion 551 may be different from the thickness T53 of the cover portion 553.

The cover portion 552 is formed of a plurality of layers, for example. Thus, the thickness T52 of the cover portion 552 is greater than the thickness T12 of the base portion 512. The cover insulating layer 55 includes a first layer 71 and a second layer 73 overlapping with the first layer 71. Each of the first layer 71 and the second layer 73 is formed of a polyimide.

The first layer 71 is formed over the body portion F1, the connection portion F3, and the terminal portion F2A. The first layer 71 has a surface 72A facing the conductor layer 53 and a surface 72B on a side opposite to the surface 72A.

The second layer 73 is formed on the connection portion F3. The second layer 73 has a surface 74A facing the surface 72B and a surface 74B on a side opposite to the surface 74A. In the example shown in FIG. 7, the surface 74B is located lower than the surface 72B of the first layer 71 located on the cover portion 551 and the cover portion 553.

The thickness T52 of the cover portion 552 corresponds to the sum of a thickness T71 (shown in FIG. 7) of the first layer 71 and a thickness T73 (shown in FIG. 7) of the second layer 73. The thickness T73 of the second layer 73 is greater than the thickness T71 of the first layer 71, for example.

The thickness T71 of the first layer 71 is from 3 μm to 7 μm, for example. The thickness T71 of the first layer 71 is 4 μm, in one example. The thickness T73 of the second layer 73 is from 4 μm to 8 μm, for example. The thickness T73 of the second layer 73 is 5 μm in one example.

The thickness T73 of the second layer 73 may be smaller than the thickness T71 of the first layer 71 or equivalent to the thickness T71 of the first layer 71. The thickness T73 of the second layer 73 is smaller than the thickness T12 of the base portion 512.

When the base insulating layer 51 is focused, the thickness of the base insulating layer 51 in the connection portion F3 is smaller than the thickness of the cover insulating layer 55 in the connection portion F3. More specifically, the thickness T12 of the base portion 512 is smaller than the thickness T52 of the cover portion 552. When the conductor layer 53 is focused, the thickness T12 of the base portion 512 is smaller than the thickness of the conductor layer 53, and the thickness T52 of the cover portion 552 is greater than the thickness of the conductor layer 53.

The base portion 512 constitutes a thin portion functioning as an adjustment portion for adjusting the deformation amount of the connection portion F3. The cover portion 552 constitutes a thick portion functioning as an adjustment portion for adjusting the deformation amount of the connection portion F3.

The flexure 40 further includes a metal base 45 (second metal base) in the terminal portion F2A. The metal base 45 is arranged on the surface 52A located on the base portion 513. The metal base 45 has a circular shape, for example, when viewed in the third direction Z. The metal base 45 has a surface 47A facing the surface 52A located on the base portion 513 and a surface 47B located on a side opposite to the surface 47A, as shown in FIG. 7. The metal base 45 is provided on the terminal portion F2B as well, though not shown.

When the piezoelectric element 63A is focused, the metal base 45 is provided between the base portion 513 and the electrode 65 of the piezoelectric element 63A. In other words, the electrode 65 faces the surface 52A with the metal base 45 interposed therebetween as shown in FIG. 7. Similarly to the metal base 41, the metal base 45 can be formed of a metal material such as stainless steel.

A through hole H1 penetrating the metal base 45 and the base portion 513 in the third direction z is formed in the terminal portion F2A. Since the through hole H1 is not formed in the conductor layer 53, the conductor layer 53 is exposed in the through hole H1. In other words, the through hole H1 connects the electrode 65 with the conductor layer 53.

The suspension 10 further comprises the adhesive member 83. The adhesive member 83 electrically connects the electrode 65 with the conductor layer 53 located on the terminal portion F2A. For example, the adhesive member 83 is formed of a conductive adhesive such as a silver paste.

The adhesive member 83 is located not only between the metal base 45 and the electrode 65, but also in the through hole H1. As a result, the electrode 65 and the conductor layer 53 of the terminal part F2A are electrically connected to each other, and power can be supplied from the flexure 40 to the piezoelectric element 63A. The adhesive member 83 is also used to connect the terminal portion F2B with the piezoelectric element 63B.

Next, a flexure 400 of the comparative example will be described.

Figure 8:
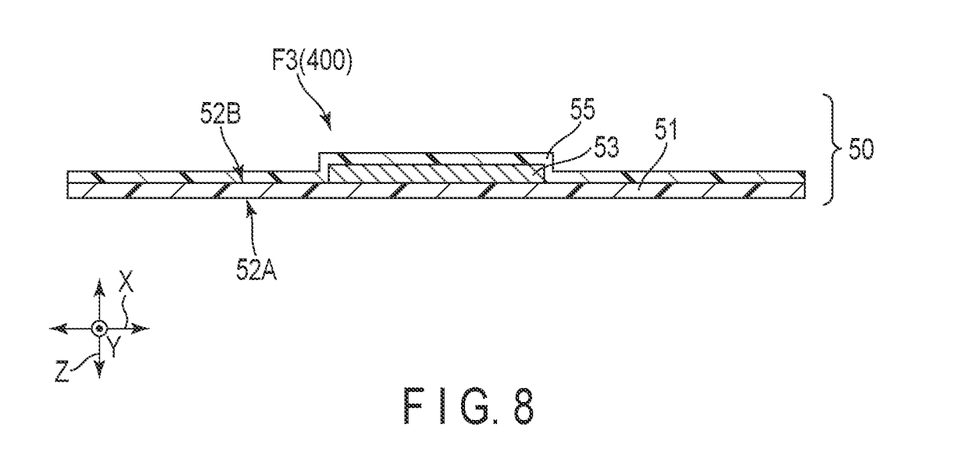
FIG. 8 is a schematic cross-sectional view showing a connection portion of the flexure according to the comparative example.
Figure 9:
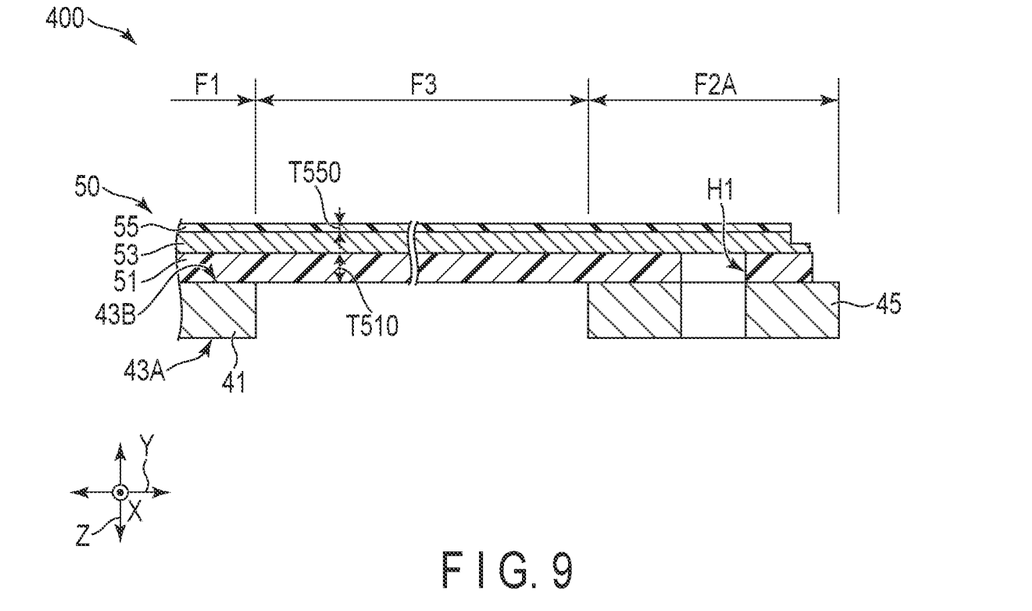
FIG. 9 is a schematic cross-sectional view showing the connection portion of the flexure according to the comparative example.

FIG. 8 and FIG. 9 are schematic cross-sectional views showing the connection portion of the flexure 400 of the comparative example. The connection portion F3 of the flexure 400 is viewed along the second direction Y in FIG. 8, and the connection portion F3 of the flexure 400 and the vicinity thereof are viewed along the first direction X in FIG. 9.

The flexure 400 includes the metal base 41 and the wiring portion 50. The wiring portion 50 may include the base insulating layer 51, the conductor layer 53, and the cover insulating layer 55.

In the comparative example, the base insulating layer 51 has a uniform thickness T510 (shown in FIG. 9) over the body portion F1, the connection portion F3, and the terminal portion F2A. In other words, the thickness T510 of the base insulating layer in the connection portion F3 is greater than the thickness T12 (shown in FIG. 7) of the base portion 512 in the present example.

In the comparative example, the cover insulating layer 55 has a uniform thickness T550 (shown in FIG. 9) over the body portion F1, the connection portion F3, and the terminal portion F2A. The cover insulating layer 55 does not include a layer corresponding to the second layer 73 of the cover insulating layer 55 in the present embodiment.

In other words, the thickness T550 of the cover insulating layer 55 in the connection portion F3 is smaller than the thickness 52 (shown in FIG. 7) of the cover portion 552 in the present embodiment. In the comparative example, the thickness T510 of the base insulating layer 51 in the connection portion F3 is greater than the thickness T550 of the cover insulating layer 55 in the connection portion F3.

In the process of curing the conductive adhesive by ultraviolet rays (UV) or heat, the humidity changes around the terminal portion F2A to be connected. Since the base insulating layer 51 and the cover insulating layer 55 are formed of polyimide, the base insulating layer 51 and the cover insulating layer 55 may be subjected to hygroscopic expansion and deform due to changes in ambient humidity.

Since the metal base 41 is not provided on the connection portion F3, the base insulating layer 51 and the cover insulating layer 55 are easily deformed in the connection portion F3. In the flexure 400 in the comparative example, the thickness T510 of the base insulating layer 51 is greater than the thickness T550 of the cover insulating layer 55 in the connection portion F3.

Therefore, when the base insulating layer 51 and the cover insulating layer 55 are subjected to hygroscopic expansion, the connection portion F3 tends to deform in the direction in which the terminal portion F2A becomes farther from the piezoelectric element 63A (upward in FIG. 9). This deformation of the connection portion F3 enlarges the gap between the terminal portion F2A and the electrode 65 of the piezoelectric element 63A.

Such an enlarged gap can be a factor for the decrease in reliability in the electrical connection between the terminal portion F2A and the electrode 65. This can occur before, after, and during the curing of the conductive adhesive.

In the flexure 40 configured as described above, the thickness of the base insulating layer 51 in the connection portion F3 is smaller than the thickness of the cover insulating layer 55 in the connection portion F3. More specifically, the thickness T12 of the base portion 512 is smaller than the thickness T52 of the cover portion 552.

As a result, even when the base insulating layer 51 and the cover insulating layer 55 are subjected to hygroscopic expansion due to changes in ambient humidity, the connection portion F3 hardly deforms in the direction in which the terminal portion F2A becomes farther from the electrode 65 of the piezoelectric element 63A. In other words, the flexure 40 of the present embodiment can adjust the amount of deformation (warpage amount) of the connection portion F3.

By making the terminal portion F2A hardly deformable in the direction in which the connection portion F2A becomes farther from the electrode 65 of the piezoelectric element 63A, the conductor layer 53 of the terminal portion F2A and the electrode 65 can be stably connected to each other via the adhesive member 83. As a result, the present embodiment can provide the flexure 40 and the suspension 10 that can increase reliability.

In the present embodiment, the connection portion F3 of the flexure 40 is easily deformable in the direction in which the terminal portion F2A becomes closer to the electrode 65 of the piezoelectric element 63A. In other words, the occurrence of stress in the connection portion F3 in the direction in which the terminal portion F2A becomes farther from the electrode 65 of the piezoelectric element 63A can be reduced. Since the terminal portion F2A becomes closer to the electrode 65 of the piezoelectric element 63A, the reliability of the flexure 40 and the suspension 10 can be increased.

In the present embodiment, the gap between the terminal portion F2A and the electrode 65 can be adjusted. More specifically, a desired gap can be formed between the metal base 45 and the electrode 65 of the piezoelectric element 63A. Thus, it is possible to properly provide the conductive adhesive for this gap. In other words, the conductive adhesive hardly expands excessively to the surround of the metal base 45 and pull hardly occurs.

In the present embodiment, the thicknesses T11 and T13 of the base portion 511 and base portion 513 are greater than the thickness T12 of the base portion 512. Since the base portion 511 and the base portion 513 are the portions overlapping with the metal base 41 and the metal base 45, insulation resistance can be maintained in these portions.

In the present embodiment, the thickness T51 of the cover portion 551 is smaller than the thickness T52 of the cover portion 552. For example, the rigidity of the flexure 40 at a gimbal portion 9 (shown in FIG. 3) located on the body portion F1 is desirably small.

When the thickness of the cover insulating layer 55 is increased in the entire flexure 40, the rigidity of the flexure 40 in the vicinity of the gimbal portion 90 is increased. As a result, the control of the gimbal portion 90 using the actuator may be difficult.

In the present embodiment, since the thickness T51 of the cover portion 551 is smaller than the thickness T52 of the cover portion 552, the effect on the control of the gimbal portion 90 can be suppressed and thus the reliability of the suspension 10 can be increased. In other words, the present embodiment can adjust the amount of deformation of the connection portion F3 while suppressing the effect on the characteristics of the suspension 10. Along with the above advantages, various other advantages can be achieved by the present embodiment.

In the present embodiment, as another example, the thickness T12 of the base portion 512 may be smaller than the thickness T11 of the base portion 511 and the thickness T13 of the base portion 513, and the cover insulating layer 55 may have a uniform thickness over the body portion F1, the connection portion F3, and the terminal portion F2A.

In the present embodiment, as yet another example, the thickness T52 of the cover portion 552 may be greater than the thickness T51 of the cover portion 551 and the thickness T53 of the cover portion 553, and the base insulating layer 51 may have a uniform thickness over the body portion F1, the connection portion F3, and the terminal portion F2A.

In the connection portion F3, the area in which the thicknesses of the base insulating layer 51 is decreased and the area in which the thickness of the cover insulating layer 55 is increased can be adjusted according to the type of the suspension 10. For example, the shapes, widths, and lengths in these areas can be adjusted according to the type of the suspension 10.

In the present embodiment, an example in which the thickness T52 of the cover portion 552 is increased by forming the cover insulating layer 55 in two layers is disclosed, but the thickness T52 of the cover portion 552 can be increased by forming the cover insulating layer 55 in one layer, or the thickness T52 of the cover portion 552 can be increased by forming the cover insulating layer 55 in three or more layers.

Next, another embodiment will be described. In the following another embodiment, constituent elements identical to those of the first embodiment described above will be designated by the same reference numbers, and detailed descriptions therefor will be omitted or simplified in some cases.

Second Embodiment

Figure 10:
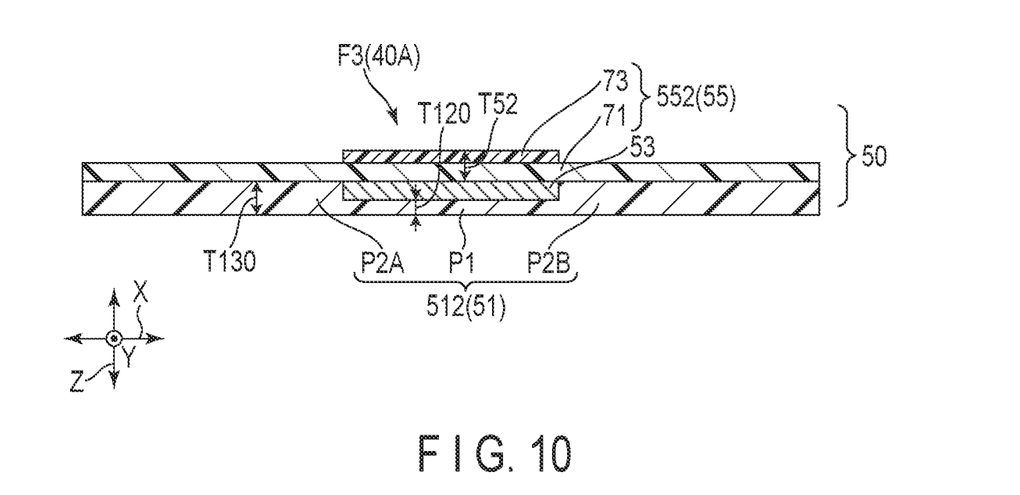
FIG. 10 is a schematic cross-sectional view of a flexure according to a second embodiment.

FIG. 10 shows a schematic cross-sectional view of a flexure 40A of the present embodiment. In FIG. 10, a connection portion F3 of the flexure 40A is viewed along the second direction Y.

As shown in FIG. 10, a base portion 512 includes a first portion P1 overlapping with a conductor layer 53 and second portions P2A and P2B located on both sides of the first portion P1 in the first direction X. The second portions P2A and P2B do not overlap with the conductor layer 53. The second portion P2A, the first portion P1, and the second portion P2B are aligned in the first direction X. A thickness T120 of the first portion P1 is smaller than a thickness T130 of the second portions P2A and P2B.

A first layer 71 of a cover insulating layer 55 overlaps with an entire base insulating layer 51. A second layer 73 of the cover insulating layer 55 overlaps with the conductor layer 53 with the first layer 71 interposed therebetween. The thickness T120 of the first portion P1 is smaller than a thickness T52 of a cover portion 552, as shown in FIG. 10.

Next, the analysis result of the deformation in a case where the base insulating layer 51 and the cover insulating layer 55 are subjected to hygroscopic expansion will be described.

Figure 11:
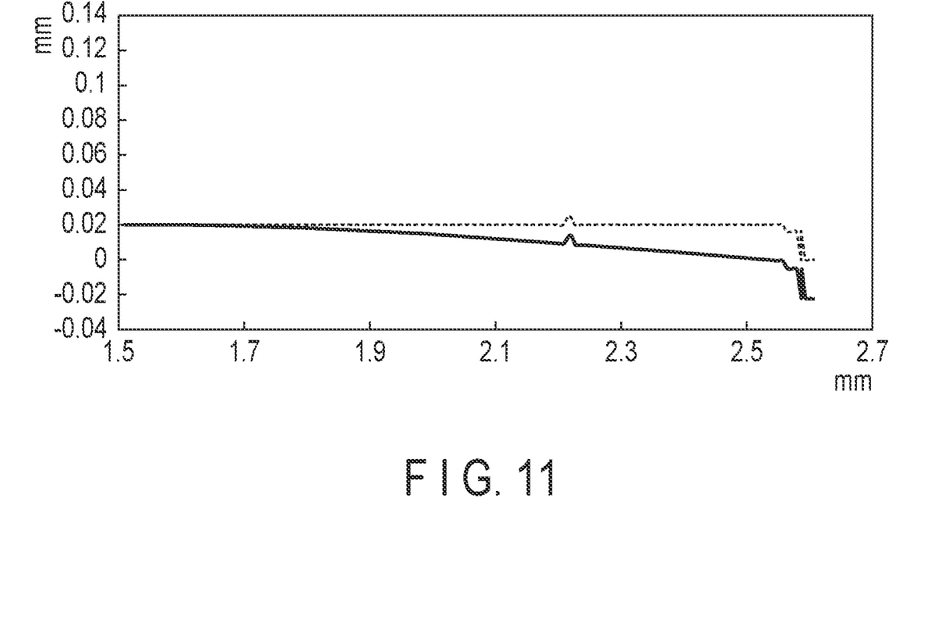
FIG. 11 is a chart showing an analysis result.
Figure 12:
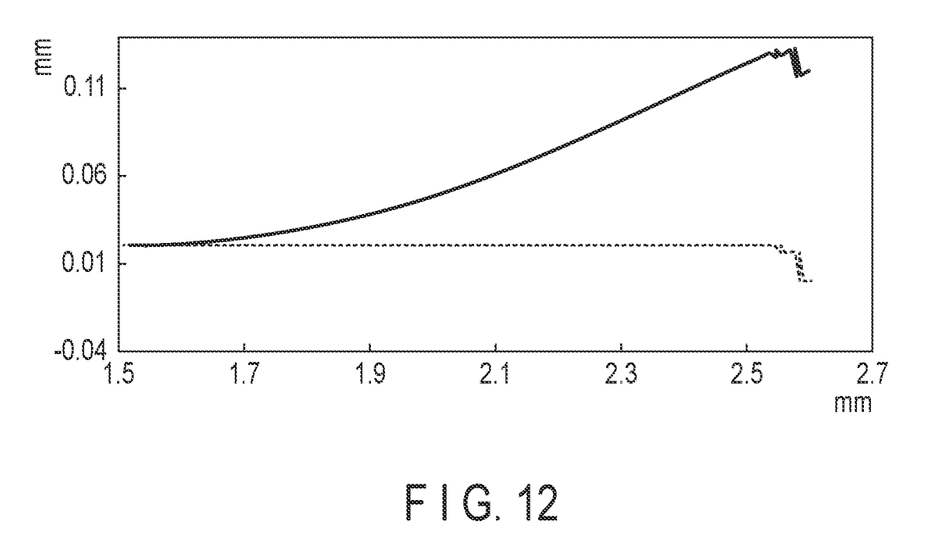
FIG. 12 is a chart showing an analysis result.

FIG. 11 and FIG. 12 show the analysis result. FIG. 11 shows the analysis result of the flexure 40A of the present embodiment, and FIG. 12 shows the analysis result of the flexure 400 of the comparative example (shown in FIG. 8 and FIG. 9).

The conditions in the analysis are as follows.

In the flexure 40A, the thickness T120 of the first portion P1 is 5 μm, a thickness T71 of the first layer 71 of the cover insulating layer is 4 μm, and a thickness T73 of the second layer 73 is 5 μm. In the flexure 400 of the comparative example, a thickness T510 of the base insulating layer 51 is 10 μm, and a thickness T550 of the cover insulating layer is 4 μm. The conductor layer 53 is 6 μm in each of the flexures 40A and 400.

In FIG. 11 and FIG. 12, the traverse axis shows the position (mm) from a body portion F1, and the vertical axis shows the position (mm) in the third direction Z. As the value on the vertical axis becomes greater, the terminal portion becomes farther from an electrode 65 of a piezoelectric element 63A, and as the value on the vertical axis becomes smaller, the terminal portion becomes closer to the electrode 65 of the piezoelectric element 63A.

In FIG. 11 and FIG. 12, a state before hygroscopic expansion is represented by dashed lines, and a state after hygroscopic expansion is represented by solid lines. The analysis result in a case where the base insulating layer 51 and the cover insulating layer 55 absorb 80% of moisture will be described.

In the flexure 40A, a value in the third direction Z becomes smaller as the flexure 40A becomes farther from the body portion F1, as shown in FIG. 11. In other words, it is confirmed that the connection portion F3 deforms such that a terminal portion F2A becomes closer to an electrode 65 of the piezoelectric element 63A after hygroscopic expansion.

On the other hand, in the flexure 400, as shown in FIG. 12, it is confirmed that a value in the third direction Z increases as the flexure 400 becomes farther from the body portion F1. In other words, it is confirmed that the connection portion F3 deforms such that the terminal portion F2A becomes farther from the electrode 65 of the piezoelectric element 63A after hygroscopic expansion.

Thus, in the analysis result, it is confirmed that in the flexure 40A of the present embodiment, the connection portion F3 deforms such that the terminal portion F2A becomes closer to the electrode 65 of the piezoelectric element 63A after hygroscopic expansion.

Although the analysis result of the flexure 40A in the present embodiment is described, a result showing the same advantageous effect as the present embodiment can be obtained by even the flexure 40 of the first embodiment. In other words, in the present embodiment as well, an advantageous effect similar to that of the first embodiment can be obtained.

Third Embodiment

Figure 13:
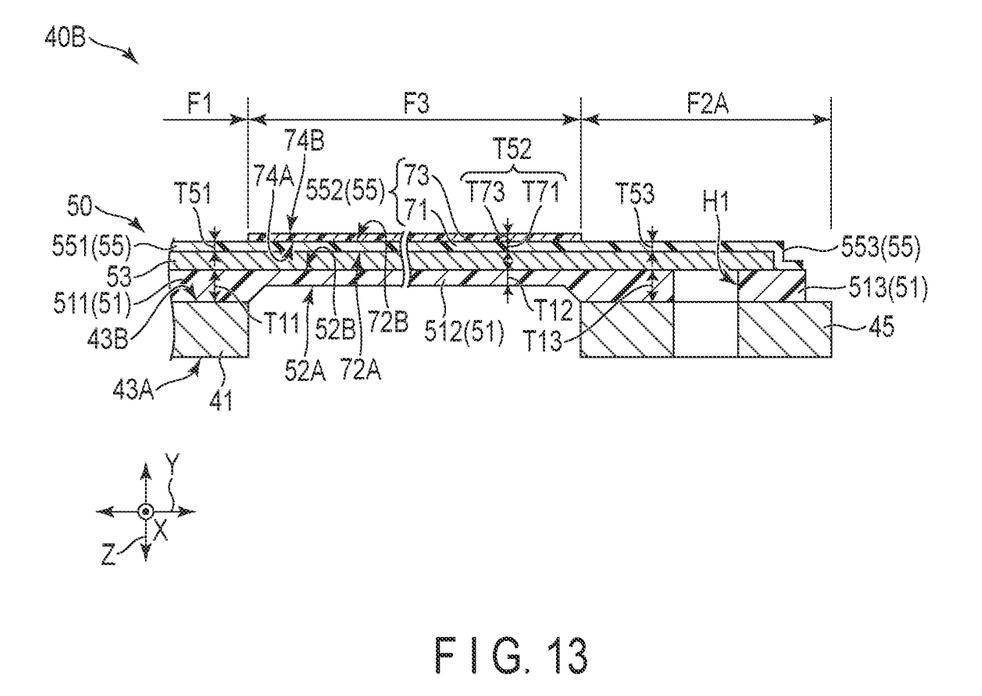
FIG. 13 is a schematic cross-sectional view showing a connection portion of a flexure according to a third embodiment.

FIG. 13 shows a schematic cross-sectional view showing a connection portion of a flexure 40B of the present embodiment. In the present embodiment, a base portion 512 of a base insulating layer 51 is formed by polyimide etching. In this case, a surface 52A located on the base portion 512 is located above a surface 52A located on a base portion 511 and a base portion 513.

A surface 74B of a second layer 73 of a cover portion 552 is located above a surface 72B of a first layer 71 located on a cover portion 551 and a cover portion 553 in the example shown in FIG. 13.

In the present embodiment as well, the same advantageous effect as the first embodiment can be obtained. The base insulating layer 51 may be formed by combining polyimide etching and the gradation mask described in the first embodiment. The base insulating layer 51 may be formed by methods other than those described in each of the above-described embodiments.

When carrying out the inventions disclosed in the above embodiments, the specific forms of each of the elements constituting the disk drive suspension, in addition to the specific forms regarding the shapes of the baseplate, the load beam, the flexure, and the like can be modified variously.

Various aspects of the invention can also be extracted from any appropriate combination of constituent elements disclosed in the above-described embodiments. For example, some constituent elements may be deleted from the entire constituent elements in each of the embodiments. Furthermore, the constituent elements described in different embodiments may be combined arbitrarily.

The base portion 512 of the base insulating layer 51 may include a plurality of portions having thicknesses smaller than the cover portion 552 of a cover insulating layer 55 in the second direction Y. Similarly, the cover portion 552 of the cover insulating layer 55 may include a plurality of portions having thickness greater than that of the base portion 512 of the base insulating layer 51 in the second direction Y.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flexure including a first metal base and a wiring portion overlapping with the first metal base, the flexure comprising:
a body portion including the first metal base;
a terminal portion electrically connected to an actuator; and
a connection portion connecting the body portion with the terminal portion and not including the first metal base, wherein
the wiring portion includes:
a base insulating layer including a first surface formed over the body portion, the connection portion, and the terminal portion and facing the first metal base and a second surface on a side opposite to the first surface;
a conductor layer provided on the second surface; and
a cover insulating layer covering the conductor layer, wherein
the cover insulating layer includes a first cover portion provided on the connection portion, and
the base insulating layer includes a first base portion provided on the connection portion and having a thickness smaller than a thickness of the first cover portion.

2. The flexure of claim 1, wherein
the base insulating layer includes a second base portion provided on the body portion and having a thickness greater than the thickness of the first base portion.
3. The flexure of claim 2, wherein
the base insulating layer includes a third base portion provided on the terminal portion and having a thickness greater than the thickness of the first base portion.
4. The flexure of claim 1, wherein
the cover insulating layer includes a first layer formed on the body portion, the connection portion, and the terminal portion and a second layer formed on the connection portion and overlapping with the first layer.
5. The flexure of claim 1, wherein
the cover insulating layer includes a second cover portion provided on the body portion and having a thickness smaller than the thickness of the first cover portion.
6. The flexure of claim 5, wherein
the cover insulating layer includes a third cover portion provided on the terminal portion and having a thickness smaller than the thickness of the first cover portion.
7. A disk drive suspension, comprising:
a load beam;
the flexure of claim 1 overlapping with the load beam; and
an actuator electrically connected to the terminal portion.
8. The disk drive suspension of claim 7, further comprising:
an adhesive member, wherein
the actuator includes an electrode facing the first surface, and
the adhesive member electrically connects the electrode with the conductor layer located on the terminal portion.
9. The disk drive suspension of claim 8, wherein
the flexure further includes a second metal base located between the base insulating layer located on the terminal portion and the electrode, and
a through hole connecting the electrode with the conductor layer is formed in the base insulating layer located on the second metal base and the terminal portion.
10. The disk drive suspension of claim 7, wherein
the base insulating layer includes a second base portion provided on the body portion and having a thickness greater than the thickness of the first base portion, and
a surface of the second surface located on the first base portion is located closer to the load beam than a surface located on the second base portion.
11. The disk drive suspension of claim 7, wherein
the base insulating layer includes a second base portion provided on the body portion and having a thickness greater than the thickness of the first base portion, and
a surface of the first surface located on the first base portion is farther from the load beam than a surface located on the second base portion.

* * * * *